United States Patent
Lüthi et al.

(10) Patent No.: US 10,444,361 B2
(45) Date of Patent: Oct. 15, 2019

(54) LASER TRACKER HAVING TWO MEASUREMENT FUNCTIONALITIES

(71) Applicant: LEICA GEOSYSTEMS AG, Heerbrugg (CH)

(72) Inventors: Thomas Lüthi, Aarau (CH); Veroljub Maksimovic, Biberist (CH)

(73) Assignee: LEICA GEOSYSTEMS AG, Heerbrugg (CH)

(*) Notice: Subject to any disclaimer, the term of this patent is extended or adjusted under 35 U.S.C. 154(b) by 277 days.

(21) Appl. No.: 15/458,867

(22) Filed: Mar. 14, 2017

(65) Prior Publication Data
US 2017/0269213 A1  Sep. 21, 2017

(30) Foreign Application Priority Data

Mar. 15, 2016 (EP) .................................... 16160434

(51) Int. Cl.
*G01S 17/66* (2006.01)
*G01S 7/481* (2006.01)
(Continued)

(52) U.S. Cl.
CPC ............ *G01S 17/66* (2013.01); *G01S 7/4812* (2013.01); *G01S 7/4815* (2013.01);
(Continued)

(58) Field of Classification Search
CPC ..... G01C 15/002; G01S 17/42; G01S 7/4813; G01S 7/4817; G01S 7/4818; G01S 17/89;
(Continued)

(56) References Cited

U.S. PATENT DOCUMENTS 8,031,331 B2  10/2011  Meier et al.
9,400,175 B2  7/2016  Lüthi et al.
(Continued)

FOREIGN PATENT DOCUMENTS

DE  196 10 970 A1  9/1997
EP  0 553 266 B1  5/1997
(Continued)

OTHER PUBLICATIONS

Newbury, et al., "Frequency-Comb Based Approaches to Precision Ranging Laser Radar", National Institute of Standards and Technology, Coherent Laser Radar Conference XVI, Jun. 2011, pp. 1-4.
European Search Report dated Sep. 16, 2016 as received in Application No. 16160434.3.

*Primary Examiner* — Luke D Ratcliffe
(74) *Attorney, Agent, or Firm* — Maschoff Brennan (57) ABSTRACT

A laser tracker for industrial coordinative position determination of a target, wherein the laser tracker at least comprises a control and evaluation unit, a base and a beam directing unit, means for detecting a rotation angle of the beam directing unit relative to the base, and a first optical distance measuring unit having at least a first beam source and a first detection unit. The distance measuring unit and the control and evaluation unit are designed for implementing a first and a second measurement functionality, where at least one element of the distance measuring unit is designed for dual use in the first and in the second measurement functionality. The first measurement functionality is for coordinative position determination of a retroreflective target, and the second measurement functionality is for position determination of a diffusely scattering target.

15 Claims, 5 Drawing Sheets

(51) Int. Cl.
  *G01S 17/42* (2006.01)
  *G01S 17/10* (2006.01)
  *G01S 17/32* (2006.01)
  *G01S 17/87* (2006.01)

(52) U.S. Cl.
  CPC ............ *G01S 7/4817* (2013.01); *G01S 17/10* (2013.01); *G01S 17/32* (2013.01); *G01S 17/42* (2013.01); *G01S 17/87* (2013.01)

(58) Field of Classification Search
  CPC ...... G01S 7/4808; G01S 17/023; G01S 17/87; G01S 17/66; G01B 11/002
  See application file for complete search history.

(56) References Cited

U.S. PATENT DOCUMENTS

| | | |
|---|---|---|
| 9,401,024 B2 | 7/2016 | Kwiatkowski |
| 2014/0226145 A1 | 8/2014 | Steffey et al. |
| 2015/0241204 A1* | 8/2015 | Steffey ................ G01C 15/002 356/4.01 |
| 2016/0252619 A1 | 9/2016 | Markendorf et al. |

FOREIGN PATENT DOCUMENTS

| | | |
|---|---|---|
| EP | 2 557 391 A1 | 2/2013 |
| EP | 1 869 397 B1 | 5/2013 |
| EP | 2 589 982 A1 | 5/2013 |
| EP | 2 827 099 A1 | 1/2015 |
| WO | 03/062744 A1 | 7/2003 |
| WO | 2007/079600 A1 | 7/2007 |

\* cited by examiner

LASER TRACKER HAVING TWO MEASUREMENT FUNCTIONALITIES

FIELD OF THE INVENTION

The invention relates to a laser tracker for industrial coordinative position determination of a target with an optical distance measuring unit and a method for coordinative position determination.

BACKGROUND

Laser trackers are used for industrial measurement, e.g. for coordinative position determination of points of a component such as a vehicle body for example in the context of an inspection or for continuous position monitoring of a moving machine part. Such laser trackers are designed for coordinative position determination of said target point and usually for continuous tracking of a retroreflective target point. In this case, a target point can be represented by a retroreflective unit (e.g. cube prism) which is targeted by an optical measurement beam generated by a beam source of the measuring device or of the measuring apparatus, in particular a laser beam. The laser beam is reflected back to the measuring apparatus in a parallel fashion, the reflected beam being detected by detection means of the apparatus. In this case, an emission direction and respectively a reception direction of the beam are ascertained, for example by means of sensors for angle measurement which are assigned to a deflection mirror or a targeting unit of the system. In addition, with the detection of the beam, a distance from the measuring apparatus to the target point is ascertained, e.g. by means of time-of-flight or phase difference measurement or by means of the Fizeau principle. The position coordinates of the target point are determined on the basis of the emission direction and respectively the reception direction and the distance.

For distance measurement, laser trackers in the prior art comprise at least one distance measuring device, wherein the latter can be designed e.g. as an interferometer (IFM). Since such distance measuring devices can measure only relative changes in distance, in order to determine an absolute distance value so-called absolute distance measuring devices (ADM) are installed in present-day laser trackers. A combination of an absolute distance measuring device and an interferometer for determining distance is known from WO 2007/079600 A1, for example.

In addition, in modern tracker systems, an offset of the received measurement beam from a zero position is ascertained on a fine targeting sensor. By means of this measurable offset, it is possible to determine a difference in position between the center of a retroreflector and the impingement point of the laser beam on the reflector and it is possible to correct or readjust the alignment of the laser beam depending on this deviation in such a way that the offset on the fine targeting sensor is reduced, in particular is "zero", and the beam is thus aligned in the direction of the reflector center. As a result of the readjustment of the laser beam alignment, continuous target tracking of the target point can be carried out and the distance and position of the target point can be determined continuously relative to the measuring device. The readjustment can be realized in this case by means of a change in alignment of the deflection mirror provided for deflecting the laser beam, said deflection mirror being movable in a motorized manner, and/or by pivoting of the targeting unit comprising the beam-guiding laser optical unit.

The target point or the retroreflector can be fitted in this case on an auxiliary measuring instrument, e.g. a so-called contact sensing tool that is positioned with a contact point on a point of the object to be measured. The contact sensing tool comprises markings, e.g. light points, and a reflector, which represents the target point on the contact sensing tool and is targetable by the laser beam of the tracker, the positions of the markings and of the reflector relative to the contact point of the contact sensing tool being known precisely.

What is not possible with customary laser trackers in the prior art is the measurement of distances without the use of measuring aids comprising a retroreflector, i.e. measurement directly to a surface of an object to be measured. Primarily, with such laser trackers, can scanning measurement of surface points is possible, that is to say determination of very many point coordinates, which is carried out in a comparatively short time. For this purpose, however, losses in accuracy have to be accepted in comparison with the measurement of retroreflective targets.

US 2014/0226145 A1 discloses a laser tracker which can measure both a retroreflective target and a natural (that is to say non-retroreflective) surface. For this purpose, the laser tracker comprises a first absolute distance measuring device, which is designed as known for measurement with respect to a retroreflector. In addition, the laser tracker comprises a second ADM, which is designed for measurement with respect to an object surface. Although the respective ADMs transmit their measurement radiation through a single exit optical unit, they are in each case separate, independent units. The need to provide two completely independent, separate absolute distance measuring devices is disadvantageously complex in terms of production engineering and thus expensive.

SUMMARY

An improved laser tracker is described herein.

Some embodiments provide such a laser tracker which enables measurement both with respect to a retroreflective target and with respect to a diffusely scattering target with improved construction and/or reduced structural complexity.

Some embodiments provide an improved method for industrial coordinative position determination.

The invention relates to a laser tracker for industrial coordinative position determination of a target. The laser tracker at least comprises a base, a control and evaluation unit for dataprocessing and for control of the laser tracker. Furthermore, the laser tracker comprises a beam directing unit, which is rotatable about two axes relative to the base and comprises an emission and reception optical unit for emitting light as measurement radiation onto the target and for receiving measurement radiation reflection. Furthermore, the laser tracker comprises means for detecting rotation angles of the beam directing unit relative to the base. Moreover, the laser tracker comprises an optical distance measuring unit, by means of which an absolute distance to the target is determinable for coordinative position determination. The position of the target is determinable on the basis of the detected rotation angles and the determined absolute distance. The optical distance measuring unit comprises at least the following elements: a first beam source, preferably a superluminescence LED (SLED) or laser source, for generating a first measurement radiation, and a first detection unit for detecting received measurement radiation reflection. In this case, an element is understood to mean a component which fulfils a specific superordinate function such as e.g. the detection of measurement radiation or the generation of measurement radiation. In this case, such an element or component can consist of individual component parts or subelements which, as component group, realize the superordinate function. In this regard, e.g. the beam source can comprise a plurality of in each case light-generating component parts, that is to say two partial elements, for example, which each per se generate light and in interaction—e.g. by combination, superimposition or alternating use—overall generate or form the first measurement radiation. Light is understood to mean not just radiation in the visible range of the spectrum, but e.g. also radiation in the infrared range. By way of example, light having a frequency of or in a frequency range around 650, 750, 795, 800, 830, 840, 850, 905, 1270, 1300, 1330, 1400 or 1550 nm is used as measurement radiation.

According to the invention, the control and evaluation unit and the optical distance measuring unit are designed for implementing a first and a second measurement functionality. For this purpose, at least one element of the distance measuring unit is designed for dual use both in the first and in the second measurement functionality. To put it another way, at least one constituent of the distance measuring unit is used in the context of the first and the second measurement functionality, whereas optionally other constituents of the distance measuring unit are used only in the first or only in the second measurement functionality. In this case, the distance measuring unit is embodied in an integrated design, such that the elements are a fixed constituent of the distance measuring unit. The two measurement functionalities are specialized for two different types of target to be measured: the first measurement functionality is designed for coordinative position determination of a retroreflective target, and the second measurement functionality is designed for coordinative position determination of a diffusely scattering target. In other words, the coordinative position determination of the target in the presence of a cooperative target is carried out with the first measurement functionality, and the coordinative position determination of the target in the presence of a diffusely scattering target such as e.g. an object surface is carried out with the second measurement functionality, for which purpose the control and evaluation unit and the distance measuring unit are specifically designed, wherein the distance measuring unit for this purpose comprises at least one element which is designed for double use in the first and also in the second measurement functionality, that is to say is used in both measurement functionalities.

Optionally, the first beam source is an element for dual use. That is to say that the at least one element for double use both in the first and in the second measurement functionality is the first beam source, wherein the latter needs not be the sole element of the distance measuring unit that is used in dual use. For dual use, optionally, the first beam source is operable in different operating states or with different parameters, wherein these at least two operating states preferably differ with regard to the power and/or emission duration of the generated first measurement radiation, that is to say that, for example, the first beam source emits with a lower power in the first measurement functionality than in the second measurement functionality and/or is measured in continuous wave (CW) operation in the first measurement functionality and in pulsed operation in the second measurement functionality. By way of example, according to the invention, a variable temperature of a laser diode as first beam source and/or a variable electric current present at the laser diode can embody the operating state. At any rate, in this optional embodiment of the laser tracker, determining a distance to the target is carried out, both in the first and in the second measurement functionality, using the first measurement radiation, as a result of which, therefore, for any type of target, the coordinative position determination is carried out on the basis of first measurement radiation reflected from the target and detected, wherein in this case the first measurement radiation can have different properties or be detected and/or evaluated differently, depending on the measurement functionality.

In a further development of the laser tracker according to the invention, said laser tracker is designed for continuously tracking a moving retroreflective target in the first measurement functionality. Consequently, tracking of the target is thus carried out in the context of the first measurement functionality. For continuous target tracking or fine targeting of the target, the laser tracker comprises e.g. a target fine targeting and tracking unit (ATR unit; automatic target recognition) with a fine targeting sensor or surface sensor and preferably with a fine targeting beam source, and an offset of received fine targeting radiation or measurement radiation from a zero position is ascertained for example on the fine targeting sensor of the laser tracker. In this context, fine targeting sensor should be understood to mean a surface sensor, e.g. a CMOS sensor, CCD sensor, or position-sensitive sensor (PSD), which can be used preferably to determine a centroid of a light distribution on the sensor surface. The surface sensor is optionally part of an ATR camera. In this case, the output signal of the sensor is generated by means of one or more photosensitive surfaces and is dependent on the respective position of the light centroid. By means of a downstream or integrated electronic unit, the output signal is evaluated and the centroid is ascertained. In this case, ascertaining the position of the centroid of the impinging light point can be carried out very rapidly (e.g. microseconds range) and with a nanometer resolution. For this purpose and in order to achieve a high accuracy, the field of view of the ATR camera or of the sensor is chosen to be comparatively small, i.e. corresponding to the beam diameter of the fine targeting beam or measurement laser beam. In this case, a detection is preferably carried out coaxially with respect to the measurement axis, that is to say measurement direction of the first measurement radiation, such that the detection direction corresponds to the measurement direction. By means of this measurable offset of the received measurement radiation from a zero position, a difference in position between the center of a retroreflector and the impingement point of the measurement beam on the reflector is determined and the alignment of the fine targeting beam or measurement beam is corrected or readjusted depending on this deviation in such a way that the offset on the fine targeting sensor is reduced, in particular is "zero", and the measurement axis is thus aligned in the direction of the reflector center. As a result of the readjustment of the alignment of the measurement axis or of the beam, optionally, continuous target tracking of the target point is carried out and the distance and position of the target point will be determined continuously relative to the measuring device. The readjustment can be realized in this case by means of a change in alignment of the deflection mirror provided for deflecting the laser beam, said deflection mirror being movable in a motorized manner, and/or by pivoting of the targeting unit having the beam-guiding optical unit.

As a further option, the laser tracker comprises an optical image capture unit with a two-dimensional, light-sensitive array, e.g. a CCD or CID camera (CCD=charge coupled device; CID=charge injection device) or a variable zoom camera based on a CMOS array. With the capture and evaluation of at least one image—by means of image capture unit and image processing by the control and evaluation unit—of a so-called auxiliary measuring instrument with markings whose fixed relative positions with respect to one another are known, an absolute or relative orientation of the auxiliary measuring instrument and of an object (e.g. a probe) arranged on the auxiliary measuring instrument in space is deduced. Such an auxiliary measuring instrument is e.g. a contact sensing tool that is positioned with a contact point on a point of the object to be measured, or a handheld scanner, as described for example in EP 0 553 266. The contact sensing tool comprises optical markings, e.g. self-luminous light points or a pattern that can be perceived optically by means of color or brightness, and a reflector, which represents the target point on the contact sensing tool and is targetable by the laser beam of the tracker, the positions of the markings and of the reflector relative to the contact point of the contact sensing tool being known precisely. Preferably, together with the spatial position of the target point determined by means of the distance measuring unit, the position and orientation of the object in space are determined precisely. Moreover, the laser tracker optionally comprises an overview camera for providing overview images, which are displayed to a user e.g. on a screen of the laser tracker.

Alternatively or additionally, the laser tracker is designed for carrying out a multiplicity of distance measurements with respect to a multiplicity of diffusely scattering targets or target points on the surface of a measurement object to be measured in the second measurement functionality. In this case, the control and evaluation unit is designed in such a way that for the multiplicity of distance measurements the respectively detected rotation angles are combined with the measured distances, such that point positions of the respective target points are defined by the combination, and a point cloud comprising a number of point positions is generatable. This is carried out e.g. at a rate of at least 1000 point positions per second; by way of example, at least 10 000 point positions are ascertained per second. To put it briefly, the laser tracker is thus designed for scanning a natural surface in the context of the second measurement functionality. In this case, the laser tracker comprises for tracking or scanning purposes means for pivoting the distance measuring unit and/or the beam directing unit relative to the base, such that a target-tracking movement of the measurement beam, or movement of the measurement beam that follows a predefined scan pattern, is made possible.

Optionally, the control and evaluation unit is designed in such a way that the measurement functionality that is optimal or suitable for the target is automatically selectable. In other words, the control and evaluation unit comprises a switchover functionality, as a result of which the user does not need to choose the appropriate measurement functionality, rather the device recognizes by itself what type of target is present and thus in which of the at least two measurement functionalities the measurement ought to be carried out. The automatic selection or the automatic switchover from one measurement functionality to the other is preferably carried out on the basis of received measurement radiation reflection, wherein this also includes reception of almost no or no measurement radiation, which is interpreted to the effect that the measurement functionality used is not suitable because it results in no signal reception. Alternatively or additionally, the switchover functionality is based on different measurement data; by way of example, it is implemented on the basis of the data that are provided by an overview camera of the laser tracker or an ATR camera of the laser tracker.

In a further development, alongside the first beam source at least one further element of the distance measuring unit is designed for dual use, that is to say that at least two of the elements of the distance measuring unit are designed for use both in the first measurement functionality and in the second measurement functionality.

In one continuation of this development, the entire distance measuring unit is designed for dual use, that is to say that all elements of the distance measuring unit are designed for double use, in both measurement functionalities. In this case, despite all the components used being identical, according to the invention in some embodiments the distance measuring unit is not employed uniformly, but rather in each case in a mode of use of the distance measuring unit that is adapted or optimized for the target or the measurement task, for which purpose at least one of the elements is operable in at least two different operating states, as described further above for example for the first beam source. This makes it possible for at least this one element to operate, in the first measurement functionality, in a manner tailored specifically for the measurement of retroreflective targets and, in the second measurement functionality, in a manner tailored specifically for the measurement of diffusely scattering targets. In this embodiment, therefore, the two different measurement functionalities are provided by means of dual use of the entire distance measuring unit with different control and/or use of the distance measuring unit or of one of the elements thereof, depending on the measurement functionality. Alternatively, in other, simpler embodiments, the dual use of the complete distance measuring unit takes place in both measurement functionalities with an identical operating mode of the distance measuring unit.

In an alternative development to the embodiment mentioned previously, at least one element of the distance measuring unit is designed for singular use in only the first or only the second measurement functionality. That is to say that at least one constituent of the distance measuring unit is used only in one of the two measurement functionalities and is not used in dual use. In some embodiments, this at least one element is a second detection unit comprising the distance measuring unit. These embodiments thus comprise a distance measuring unit which comprises at least one second detection unit besides the first detection unit.

In one embodiment with a second detection unit, the distance measuring unit is designed in such a way that the first beam source as an element for dual use generates first measurement radiation which is detectable both by the first and by the second detection unit. In this case, preferably, measurement radiation reflection of the first measurement radiation that is received in the first measurement functionality is detected exclusively by the first detection unit, and measurement radiation reflection of the first measurement radiation that is received in the second measurement functionality is detected exclusively by the second detection unit. In other words, this embodiment comprises the first beam source used in dual use in both measurement functionalities in order that two detector units used in singular use in each case in one of the two measurement functionalities are supplied with measurement radiation, or first measurement radiation which is reflected from a retroreflective target is detected e.g. by the first detector unit and first measurement radiation which is reflected from a diffusely scattering target is correspondingly detected by the second detector unit.

Alternatively, in the first and/or second measurement functionality reflected first measurement radiation is detected both by the first and by the second distance measuring unit, for example in approximately equal proportions or with a higher proportion for the second detection unit, which detects diffusely scattered measurement radiation.

Optionally, in all embodiments with the second detection unit and dual use of the first beam source, the second detection unit is designed as a waveform digitizing unit (WFD unit). As a further option, the laser tracker comprises at least one variable deflection element for influencing the optical path of the first measurement radiation, e.g. an electro-optical beam splitter having a variable optical property, or a rotatable deflection element such as a mirror, in particular in order to guide generated or reflected first measurement radiation from the first beam source depending on the measurement functionality at least substantially to the respective detection unit.

Additionally or preferably alternatively, in embodiments with a second detection unit, the distance measuring unit comprises, as at least one further element for singular use, a second beam source, preferably an SLED or laser source, for generating second measurement radiation, wherein the distance to the target is determined either in the first or in the second measurement functionality with the additional use of the second measurement radiation. The distance determination is thus carried out in one of the two measurement functionalities exclusively with the first measurement radiation. In the other measurement functionality, the distance determination is carried out on the basis of the first measurement radiation and additionally on the basis of the second measurement radiation. By way of example, in the case of one type of targets, e.g. retroreflective targets, the first measurement radiation allows only a comparatively inaccurate distance determination, which is refined by the second measurement radiation. To put it another way, the use of the second measurement radiation enables a higher precision of the distance determination, which is advantageous when measuring a target with retroreflector, but is not necessary for the second measurement functionality, primarily when scanning an object surface, and would reduce e.g. the scan speed/scan rate to an excessively great extent.

In such an embodiment, therefore, as an option the second detection unit is designed for determining relative distances, preferably in order to make more precise the absolute distance ascertained on the basis of the first measurement radiation or by means of the first detection unit, and serves for singular use in the first measurement functionality. Specifically, in this case the second detection unit is designed as an interferometer unit. In this case, the second beam source serves for providing measurement radiation for detection by the second detection unit, that is to say that the second detection unit is designed for detecting second measurement radiation and, in the context of the first measurement functionality, second measurement radiation is detected by the second detection unit.

Optionally, in some embodiments, the first detection unit is designed for determining absolute distances. Preferably, the first detection unit in this case is designed as a WFD unit, such that the distance measurement is based on the known waveform digitizing principle. Alternatively, the first detection unit is designed as an FMCW unit, such that the distance measurement is based on the known frequency-modulated continuous-wave principle, or as a frequency comb unit, such that the distance measurement is based on the known frequency comb principle, or as an absolute interferometer, such that the distance measurement is based on a known absolute, preferably frequency-scanning interferometer principle. Such a first detection unit is found, in particular, in such embodiments in which, as described above, the entire distance measuring unit is designed for dual use.

Further subject matter of the present invention is a method for industrial coordinative position determination of a target by means of a laser tracker, wherein the laser tracker at least comprises a base, a control and evaluation unit, and a beam directing unit having an emission and reception optical unit for emitting light as measurement radiation and for receiving measurement radiation reflections. Furthermore, the laser tracker comprises an optical distance measuring unit having at least the following elements: a first beam source, preferably an SLED or laser source, and a first detection unit. The method comprises at least the following steps:

generating first measurement radiation by means of the first beam source,
  emitting first measurement radiation and receiving first measurement radiation reflected from the target by means of the emission and reception optical unit,
  detecting received reflected first measurement radiation,
  determining a distance to the target on the basis of detected measurement radiation, and
  determining rotation angles of the beam directing unit relative to the base.

According to the invention, upon interrogation in each case on the basis of determined rotation angles and at least one determined distance in a first measurement functionality coordinative position determination of a retroreflective target and in a second measurement functionality coordinative position determination of a diffusely scattering target are carried out, wherein at least one element of the distance measuring unit is used in dual use both in the first measurement functionality and in the second measurement functionality. Thus, in the context of the method according to the invention, by means of switchover it is possible to carry out measurement of a cooperative target such as a retroreflective prism and also measurement of a natural object surface such as that of a metal plate or of a plastic molding.

In one development of the method according to the invention, determining a distance to the target is carried out both in the first and in the second measurement functionality using the first measurement radiation, for which purpose the first beam source serves as at least one of the elements or the one element for dual use in both measurement functionalities.

In a further development of the method according to the invention, at least one element of the distance measuring unit is used only in the first or only in the second measurement functionality. This element is e.g. the first detection unit or a second detection unit comprised by the laser tracker, and/or a second beam source which generates second measurement radiation which is used only in the first and/or second measurement functionality.

Further subject matter of the present invention is a computer program product having program code, stored on a machine-readable carrier, for controlling or carrying out the method according to the invention for coordinative position determination, particularly if the program is executed on an electronic dataprocessing unit designed as a control and evaluation unit of a laser tracker according to the invention.

The laser tracker according to the invention thus affords the advantage that two measurement functionalities are provided by a single, compact distance measuring unit, such that both retroreflective and diffusely scattering targets are measurable, preferably in a specialized manner. By means of the laser tracker according to the invention comprising only a single distance measuring unit, in comparison with devices from the prior art, the production complexity can be reduced, primarily in such embodiments in which the distance measuring unit as a whole is used in dual use. In this case, the design according to the invention of the control and evaluation unit and of the distance measuring unit of the laser tracker, which makes it possible to provide two specialized laser tracker measurement functionalities, advantageously enables an industrial coordinative position determination adapted to the respective specific type of target or measurement task. In other words, besides the industrial measurement—known per se—of targets equipped with retroreflectors, such as e.g. measuring probes, the present invention enables the industrial measurement of natural object surfaces, the structural complexity or the production costs advantageously being reduced in comparison with laser trackers from the prior art.

BRIEF DESCRIPTION OF THE DRAWINGS

The laser tracker according to the invention and the method according to the invention are described in greater detail purely by way of example below on the basis of specific exemplary embodiments that are illustrated schematically in the drawings, further advantages of the invention also being discussed. In the figures, specifically.

DETAILED DESCRIPTION

Figure 1:
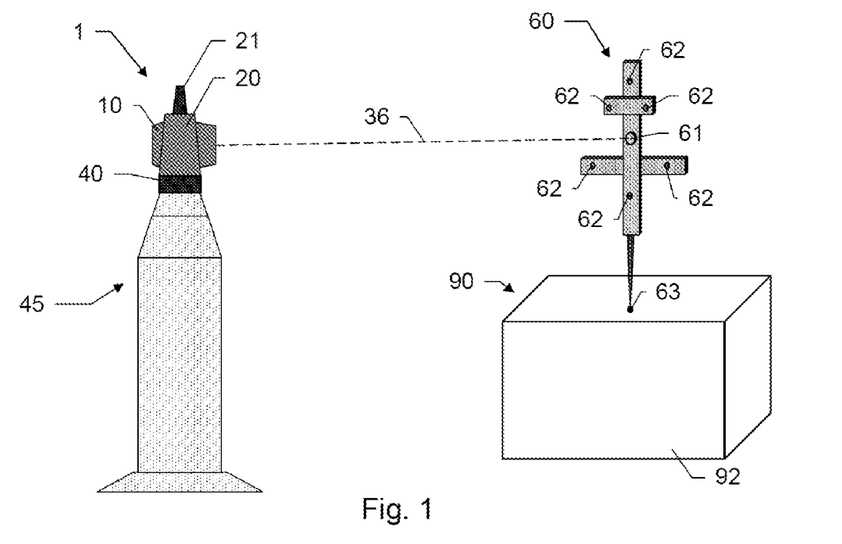
FIG. 1 shows a laser tracker according to the invention during position determination with respect to a retroreflective target in the first measurement functionality.
Figure 2:
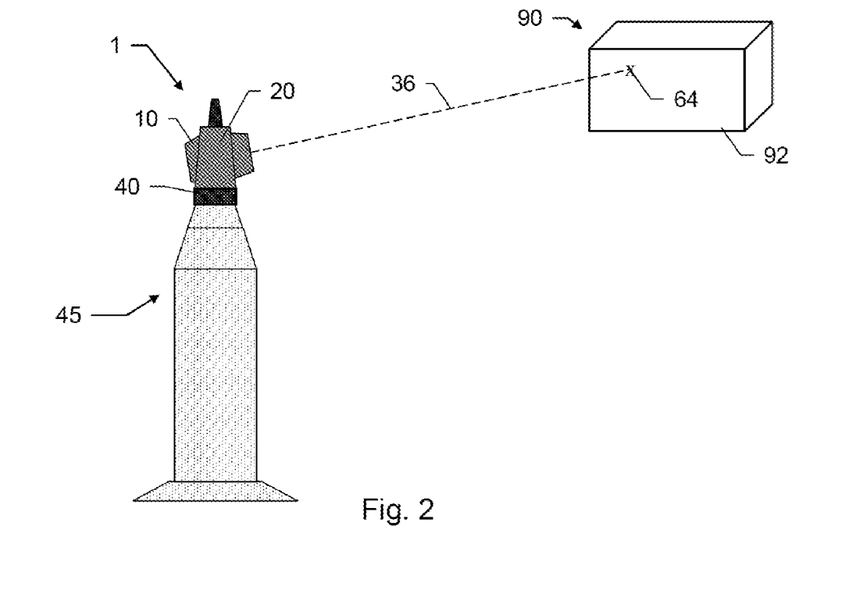
FIG. 2 shows a laser tracker according to the invention during position determination with respect to a diffusely scattering target in the second measurement functionality.
Figure 3:
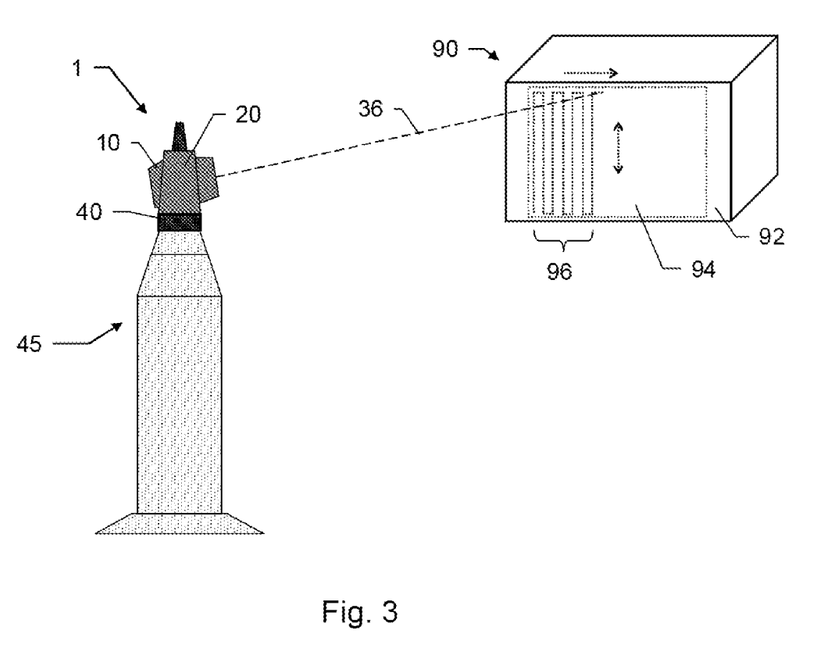
FIG. 3 shows a laser tracker according to the invention during scanning position determination with respect to a diffusely scattering target in the second measurement functionality.

FIGS. 1, 2 and 3 show one exemplary embodiment of a laser tracker 1 according to the invention. The laser tracker 1 shown comprises a base 40, a support 20 fitted thereon and having a handle 21, and a beam directing unit 10 mounted on two struts of the support 20. The laser tracker 1 is arranged on a stand 45 and comprises a control and evaluation unit, angle sensors for detecting rotation angles of the beam directing unit 10 relative to the base 40, and an optical distance measuring unit having at least one first beam source, e.g. one or more laser diodes or superluminescence LEDs, at least one first detection unit—for example an electronic distance measuring unit, an absolute distance unit (ADM) or an interferometer unit (IFM)—(not illustrated here). By means of suitable synchronization of the angle sensors, two angles and at least one distance ascertained by means of the first measurement radiation 36 are combinable to form a polar 3D coordinate of the target (here: retroreflector 61).

FIG. 1 shows how, in a first measurement functionality, the laser tracker 1, by means of light as first measurement radiation 36, measures the distance to a retroreflector 61 situated on a measuring aid 60, said retroreflector constituting the target to be measured. The measuring aid 60—embodied here by way of example as a measuring probe—furthermore comprises a number of target markings 62, for example in the form of reflective or self-luminous light points, and also a measuring head 63 for positioning on a point to be measured of a target object 90.

For finding the measuring aid 60 or the reflector 61 and aligning the light beam 36 with the reflector 61, optionally on the laser tracker 1 according to the invention provision is made of a target finding unit with one or preferably a plurality of illumination means (not illustrated here) for illuminating the reflector 61 with radiation of a specific wavelength, in particular in the infrared wavelength range, and in addition at least one, preferably two localization cameras with position-sensitive detectors and a comparatively large field of view are arranged on the device 1 (not illustrated here). The illumination radiation reflected at the reflector 61 and returned to the laser tracker 1 can be detected by means of the localization cameras and, by means of each of the position-sensitive detectors, a position of the reflector 61 can be imaged on the respective detector. Consequently, two imaged positions of the reflector can be determined and depending thereon imaged target positions of the reflector 61 can be found—e.g. according to generally known principles of photogrammetry—and the beam directing unit 10 can be aligned in such a way that the reflector 61 is targeted with the measurement beam 36. By means of the knowledge of the positioning of the cameras relative to an emission direction of the light beam 36, the light beam 36 can thus be aligned with the ascertained coarse position of the reflector 61 and locked onto the latter (lock-on). Afterward, fine targeting and/or tracking of the target can be carried out with the aid of a fine targeting sensor (PSD), as described below.

For highly accurate targeting (fine targeting) of the retroreflector 62 and in order to identify and to be able to reproduce movements of the retroreflector 62 and thus of the measuring aid 60, such that the light beam 36 remains aligned with the retroreflector 61, in the example the laser tracker 1 comprises, preferably in the beam directing unit 10, a fine targeting sensor, e.g. as part of a target fine targeting and tracking unit, wherein the fine targeting sensor is preferably a tracking surface sensor operating spatially in analog fashion, as described for example in WO 2007/079600 A1, e.g. a CMOS or CCD sensor, which can be used to determine a centroid of a light distribution on the sensor surface. On the basis of the ascertained centroid, a position difference of the light beam impingement position on the surface sensor with respect to an ideal or central position is ascertainable and the alignment of the measurement radiation (by means of changing the alignment of the beam directing unit 10) is correctable in such a way that the position difference is eliminated or at least decreasable. Consequently, by detecting the alignment of the light beam 36 reflected from a target, in particular the retroreflector 61, the fine targeting sensor enables the tracking of the alignment of the measurement beam 36. By tracking the light beam alignment, it is possible to carry out fine targeting and/or continuous target tracking of the target point and thus to continuously determine the distance and position of the target point 61 without interruption.

The laser tracker 1 comprises as a further option a measuring camera as optical image capture unit (not illustrated here). Preferably, the image capture unit is configurable as a focusable camera system having variable magnification (variable zoom measuring camera) in order to detect the target markings 62 arranged on the measuring aid 60 even when the distance to the measuring aid 60 changes. The measuring camera is rotatable for example together with the laser tracker 1 about the substantially perpendicular axis thereof, but is pivotable up and down independently of the laser tracker 1 and is thus arranged separately in particular from the optical system of the measurement beam 36. By means of adapting its alignment and magnification, the camera can thus continuously capture an image in which the measuring aid 60 and in particular the light points 62 of the measuring aid 60 are imaged. This gives rise to an electronically evaluatable, two-dimensional image of a spatial arrangement of light points. For evaluating the image, the control and evaluation unit comprises an image processing functionality. It is thus possible to identify the imaged light points 62, to determine the centroids of the imaged light points 62 and to determine the image coordinates of said centroids, from which it is possible to calculate for example solid angles between the optical axis of the laser tracker 1 or the measuring camera, in particular the capture direction, and the direction from the laser tracker 1 to the respective light points 62. The spatial alignment of the measuring aid 60 (roll, pitch and yaw angles) is determinable on the basis of the positions of the target markings 62 that are thus recorded by the measuring camera. A method—usable with such a measuring camera—for continuously determining the spatial position of a measuring aid 60 having a plurality of target markings 62 in a fixed, known spatial distribution relative to one another is described in EP 2 557 391 A1.

According to the invention, the control and evaluation unit and the distance measuring unit are designed in such a way that with the laser tracker 1 a second measurement functionality is additionally implementable, which makes it possible to measure a distance to a surface 92 of the measurement object 90, as shown in FIG. 2. For this purpose, the distance measuring unit, which—in contrast to a modular design, is embodied in an integrated design, comprises at least one element which is designed for dual use both in the first and in the second measurement functionality. Instead of only one element, alternatively a plurality of elements are designed for dual use. Alternatively, all the elements thereof are designed for dual use, that is to say that the distance measuring unit in its entirety is designed for dual use and it is optionally used differently depending on the measurement functionality, e.g. by the laser source being operated differently, such that the type of measurement radiation generation is different depending on the measurement functionality, or by the detection unit being operated differently, such that the measurement radiation detection of the first measurement functionality differs from that of the second measurement functionality, or both, such that e.g. the measurement rate is different depending on the measurement functionality. In other words, only a portion (one or more elements) of the hardware of the distance measuring unit which is used in the respective measurement functionality is identical and other portions (further elements) of the hardware are used either only in the first measurement functionality or only in the second measurement functionality. Alternatively, the complete hardware is identical and is used at least partly in different ways depending on the measurement functionality. In this case, the different use or application is effected by different operating modes or operating states of the distance measuring unit. Alternatively, the distance measuring unit designed completely for dual use is used in the same operating state in both measurement functionalities, for which purpose e.g. the first beam source and the first detection unit are coordinated with one another in such a way that both from a diffusely scattering target and from a retroreflective target—at least for certain measurement ranges, target constitutions (suitable reflectivity of the target: sufficiently highly reflective natural surface and/or sufficiently weakly reflective retroreflector) or ambient conditions—reflected measurement radiation is receivable sufficiently well (e.g. signal level not excessively high or excessively low) and is evaluatable with enough precision for the set measurement task. In such embodiments, the difference between the first and second measurement functionalities then substantially consists in the manner of evaluation of the measurement data or application of the laser tracker, e.g. application for continuous target tracking or application for scanning a surface, a combined application also being possible. Optionally, the beam directing unit 20 comprises an additional optical unit (not illustrated here), by means of which the beam 36 is influenced or varied before emission and/or before reentry (that is to say after reflection at the target 61 or 64) depending on the measurement functionality, e.g. a lens for varying the beam cross section or a focusing optical unit, or a filter or attenuator for influencing the beam intensity.

FIG. 2 shows the laser tracker 1 from FIG. 1 when measuring a distance to a point 64 of the measurement object 90 by means of the distance measuring unit in the context of the second measurement functionality. The distance is measured on the basis of received measurement radiation of the light beam 36 reflected from the object surface 92, in the example by means of a first detector unit provided in the distance measuring unit, e.g. a waveform digitizing unit (WFD unit; not illustrated here). This second measurement functionality, which is provided by means of the control and evaluation unit and distance measuring unit designed for this purpose, allows distance measurements without the use of a retroreflector or a measuring aid, that is to say a measurement with a non-cooperative target such as a point 64 of the diffusely scattering object surface 92.

By means of the control and evaluation unit, optionally here in each case from a number of measurement signals accumulated in a specific time period (e.g. depending on a chosen scan mode, see description concerning FIG. 3) a distance is ascertained and stored together with the associated solid angle data as measurement point 64 in a main memory. The time period is e.g. 0.001 s, 0.002 s, 0.004 s, 0.008 s or 0.016 s. The main memory may be part of the laser tracker 1 (not illustrated) or be an external main memory. In this case, for example, depending on parameters such as distance to the object 90 to be measured and/or requirements of the user such as e.g. resolution, measurement distance, measurement speed or measurement accuracy, it is possible to average over a different number of received measurement signals in order to obtain an individual measurement point 64, e.g. a scan point for a point cloud. Furthermore, the control and processing unit is optionally configured such that the angular velocity of the beam directing unit 10 is adapted to the distance or the scan mode which can expediently be used in the case of a specific distance.

FIG. 3 shows one embodiment of the laser tracker 1 according to the invention in which a scanning functionality is implementable by means of the distance measuring unit.

In this case, on a scanning area 94 of a surface 92 of the measurement object 90, a multiplicity of measurement or target points are successively targeted by the beam directing unit 10, in each case a distance being ascertained and linked with angle data, such that a position can be ascertained for each of the measurement points. The ascertained positions of the measurement points are then combined to form a point cloud. Targeting the points can be carried out, as illustrated here, by traversing the scanning area 94 in a regular pattern 96, e.g. in parallel paths at a defined distance from one another. The movement of the measurement beam 36 is oscillatory in the example shown here, wherein, in order to simplify the illustration, the oscillatory movement of the measurement radiation 36 is shown only for a segment of the surface 94 to be scanned. In this example, the oscillatory movement of the measurement beam 36 results from alternation of continuously vertical alignment and step-by-step horizontal alignment of the emitted measurement radiation 36 by means of the beam directing unit 10. For this purpose, the beam directing unit 10 is continuously pivoted up and down in a defined angle range about its tilting axis and in each case upon reaching the vertical turning point is horizontally pivoted in each case in the same direction in one step about the rotation axis by a predefined angle magnitude. In this case, the pivoting movements of the beam directing unit 10 are controlled by means of the control and evaluation unit of the laser tracker 1.

In the example, the scanning region 94 on the surface 92 of the object 90 is scanned at a constant pulse rate of one million laser pulses per second and at a constant scan speed, which is continuous at least in the vertical direction in this example. This results in measurement signal series comprising measurement signals. Measurement signals of the respective measurement signal series are then always accumulated over the same time period, which is dependent on the scanning mode, and the distance to the object 90 is ascertained therefrom and the associated solid angles are assigned in order to obtain a scanning point. By way of example, at the stated pulse rate in the ideal case 1000 pulses or measurement signals are for ascertaining a scanning point or distance measurement value. Instead of the measurement signal series, measurement signal fields of defined geometry and size and thus having a defined number and distribution of measurement signals can also be used to ascertain a scanning point.

Besides the oscillatory movement of the measurement radiation as shown in the example, when implementing the scanning functionality through corresponding driving of the beam directing unit 10 by means of the control and processing unit depending on the scanning mode chosen or provided by a program storage unit of the laser tracker 1, the measurement radiation can also perform any other movement in order to detect a selected scanning region 94. In particular, the pivoting about the tilting axis and also about the rotation axis can be effected continuously and, depending on the requirement, the vertical pivoting instead of the horizontal pivoting can also be effected discontinuously. If the scanning region 94 is a horizontal line, for example, then a continuous, horizontal alignment of the measurement beam 36 is effected by continuous pivoting of the beam directing unit 10 in one direction about the rotation axis. For specific requirements such as, for example, individual point measurements or measurements of points spaced far apart from one another or measurements with low resolution, the beam directing unit can also be pivoted discontinuously, in particular step-by-step, about both axes. As a specific example of a further scanning mode, a measurement with constant resolution, i.e. with constant measurement point density per measured scanning path section or measured area, can also be stored in the program storage unit. In this scanning mode, a continuous adaptive adaptation of the angular velocity of the beam directing unit 10 is carried out depending on the distance to the object 90 to be measured, such that the measurement point density for an area 94 to be scanned remains constant during the scanning process even in the case of varying distances to the object 90, e.g. in the case of a complex building structure. In this case, the distance to the object 90 to be measured is determined during the scan continuously (with each measurement pulse) or repeatedly at short intervals (every $3^{rd}$, $5^{th}$, $10^{th}$ ... measurement pulse, depending on the pulse rate).

Figure 4:
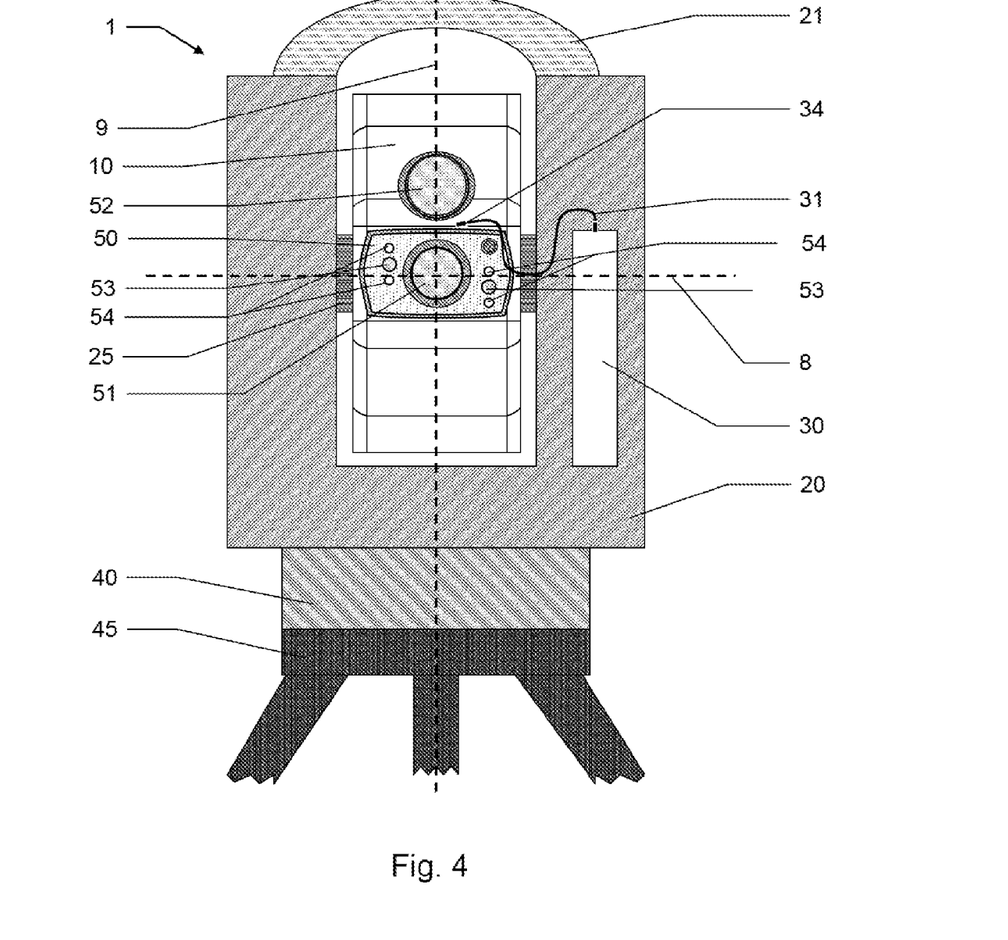
FIG. 4 shows a laser tracker according to the invention in a frontal view.

FIG. 4 shows one exemplary embodiment of a laser tracker 1 according to the invention in a frontal view. The laser tracker 1 comprises a base 40, which is fixable on a holding apparatus, here illustrated in the form of a stand 45. A support 20 is fitted on the base 40 in a manner mounted rotatably about the vertical axis 9. The support 20 comprises a first and a second strut, which project upward from a lower part of the support 20 and on which a beam directing unit 10 is mounted tiltably about the horizontal axis 8 by means of a shaft 25. A handle 21 for the transport and handling of the laser tracker 1 by a user is fitted to the two struts at the top.

Both the mounting of the support 20 on the base 40 and the mounting of the beam directing unit 10 on the support 20 are preferably embodied as a fixed-movable bearing. Axial errors owing to temperature influences and the resultant losses of accuracy are thus minimized. In addition, a temperature-governed expansion of the shaft 25 is noncritical and does not influence a strain of the bearing. The handle 21 can in particular be fixedly connected to the two struts, for example produced from a molding therewith or welded, adhesively bonded or screwed thereto, such that it serves as an additionally stabilizing element for the struts, in particular with regard to bending. The handle 21 can advantageously be shaped in such a way that it allows an exactly upwardly directed measurement, i.e. along the vertical axis 9, by means of the light beam 36. Alternatively, the handle 21 can also have an opening for passage of the measurement beam at the corresponding location.

In the example, a plurality of optical units are provided on the beam directing unit 10, including an optical unit of the measuring camera 52 and also a lens module 50 for the optical distance measurement with a laser emission and reception optical unit 51 and with optical units of the localization cameras 53 and illumination means 54 of the target finding unit. Furthermore, the beam directing unit 10 optionally comprises an optical unit of an overview camera of the laser tracker 1 for providing overview images for a user.

A first beam source 30, for example a helium-neon laser source (HeNe laser source), is integrated into the support 20, or into one of the struts, as part of the distance measuring unit. An alternative to an HeNe laser source is e.g. a laser diode. In this case, the beam source 30 can also be constructed from a plurality of e.g. laser-generating parts which overall generate a single laser radiation as first measurement radiation. An optical waveguide system comprising a fiber 31 leads from said first beam source 30 through the shaft 25 into the beam directing unit 10 as far as a collimator 34. Preferably, the optical waveguide system is polarization-maintaining, and/or the fiber 31 is a single-mode fiber. Alternatively, the beam source 30 is incorporated in the beam directing unit 10 and designed e.g. as an SLED.

The first beam source 30 is designed here in such a way that it can be used to generate the first measurement radiation, which is suitable for distance measurement both to retroreflective targets and to diffusely scattering targets and is optionally suitable both for tracking (continuous target tracking) and for scanning, such that the first beam source is thus usable in dual use in both measurement functionalities. For this purpose, the beam source 30 can be designed such that measurement radiation is suitable equally for both types of target, that is to say that the beam source 30 is operated identically in both measurement functionalities. Alternatively, the beam source 30 is operable in different operating states, such that, for example, the power of the first measurement radiation is variable or switchable between continuous-wave (CW) operation or pulsed operation, as a result of which measurement is carried out with a low power and/or in continuous-wave operation in the first measurement functionality and with laser pulses of high power in the second measurement functionality.

Figure 5A:
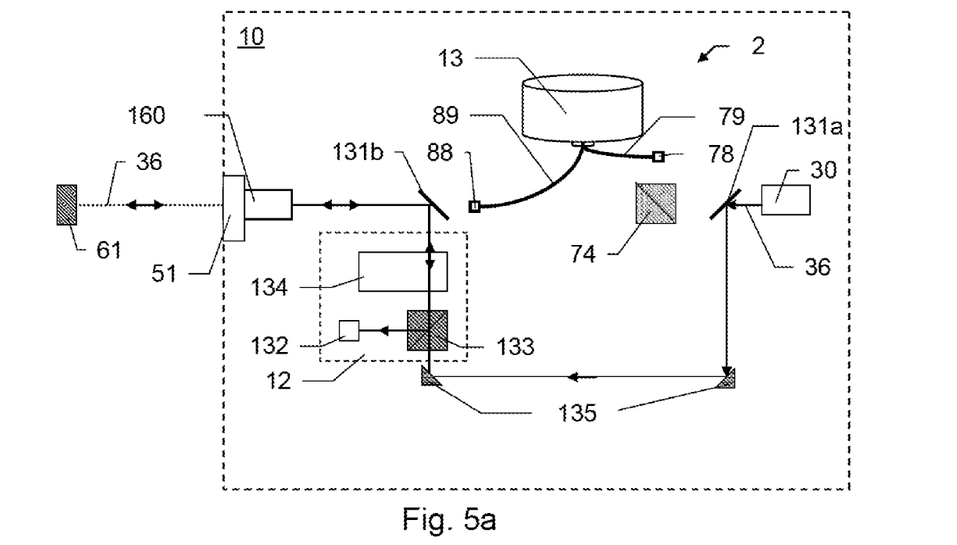
FIGS. 5a,b show a first embodiment of an optical construction of a laser tracker according to the invention in the case of use in the first and respectively the second measurement functionality.
Figure 5B:
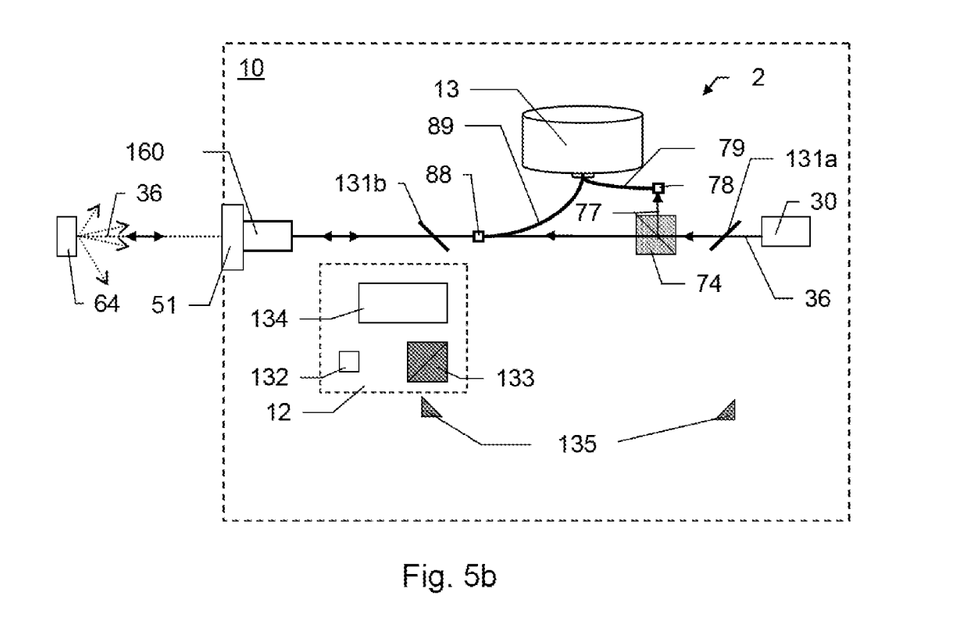

FIGS. 5a and 5b show one exemplary optical construction of a laser tracker according to the invention, wherein FIG. 5a shows the use thereof in the first measurement functionality for determining the position of a cooperative, retroreflective target 61, and FIG. 5b shows the use for determining the position of a diffusely scattering target 64.

The beam directing unit 10 comprises an optical distance measuring unit 2, which is embodied in an integrated design and correspondingly comprises in a fixedly arranged manner a first detection unit 12, designed as an absolute distance measuring unit (ADM) in the example, a second detection unit 13, designed as a waveform digitizing unit (WFD) in the example, and a first beam source 30, e.g. an HeNe laser beam source or a laser diode, which generates first measurement radiation 36.

The first measurement radiation 36 emerging from the beam source 30 impinges on a first variable beam splitter 131a, which is switchable between the two states of transmissive and reflective e.g. by means of the application of a voltage. In the first measurement functionality according to FIG. 5a, said beam splitter is reflective, for which reason the beam 36 in FIG. 5a is deflected downward and guided into the ADM by means of two deflection elements 135 (e.g. prisms). Alternatively, a corresponding guidance of the beam 36 is regulated by mechanical variation of the beam splitter 131a (e.g. variation of the rotational position) or by means of an additional optical element such as a diaphragm. There it is guided through a polarizing beam splitter 133 and an electro-optical modulator 134 to a second variable beam splitter 131b, which directs the beam 36 through the emission and reception optical unit 51 onto the reflector 61. The returning light is guided in the ADM 13 through the second variable beam splitter 131b and the polarizing beam splitter 133 onto an ADM detector 132. The distance to the target 61 is determined from the measurement signal of the ADM detector 132. In this context, it is also possible to use other ADM arrangements and methods, such as e.g. phase-based detection units or detection units operating according to the Fizeau principle.

In FIG. 5b, the distance measuring unit 2 is in the second measurement functionality. The first variable beam splitter 131a is in the transmissive state, for which reason pulsed first measurement radiation 36 of the beam source 30 is not deflected "downward", but rather impinges on the partly transmissive beam splitter 74 through the first variable beam splitter 131a. By means of the partly transmissive beam splitter 74, a reference beam 77 having the same measurement pulses as the WFD beam 36 is split off and guided onto a reference beam coupling-in element 78, which couples the reference beam 77 into a first optical waveguide 79, which leads to the WFD unit 13.

The other part of the WFD beam 36 is directed through the second variable beam splitter 131b, which is likewise in the transmissive state, and the laser emission and reception optical unit 51 onto the target 64 to be measured (surface of a diffusely scattering measurement object). A portion of the first measurement radiation 36 that is reflected from the diffusely scattering surface of the measurement object or from the target 64 passes through the laser emission and reception optical unit 51 again into the beam directing unit 10. The reflected radiation comprises target pulses which correspond to the measurement pulses but are temporally offset—in accordance with the distance to the target 64. In the beam directing unit 10, the reflected radiation is concentrated by a beam receiving unit (not illustrated) and directed through the transmissive second variable beam splitter 131b and, if appropriate, through further optical means (not illustrated here) onto a coupling-in unit 88, which couples the reflected radiation into a second optical waveguide 89, which leads to the WFD unit 13 or to the detector thereof. The detector detects both the reflected portion 81 of the WFD beam 76 and the reference beam 77. The pulses of the reflected radiation and of the reference beam 77 are digitized in a known manner referred to as waveform digitizing. The measurement pulses and target pulses digitized in this way are compared with one another, in particular the temporal separation between them, and the distance to the target point 64 is thus ascertained by the control and evaluation unit.

Waveform digitizing (WFD) is based on the combination of two basic principles for signal detection that are customary in distance measurement. The first basic principle is based on measurement signal detection on the basis of the threshold value method, and the second basic principle is based on signal sampling with downstream signal processing for identifying and determining the temporal position of the signal. Both approaches are applied in parallel with signal detection, that is to say that a received measurement pulse or a signal structure of the measurement radiation is detected by both methods, which usually implies simultaneity or at least temporal overlap of the methods. The propagation time and thus the distance between a measurement pulse emitted by the beam source 30 and a target pulse (measurement pulse reflected from the target point 64 and detected by the second detection unit 13) follow for example from the temporal separation of the peak points of the two pulses, the pulses being sampled in a manner similar to that in the case of phase measuring devices. Advantageously, it is also possible to ascertain distances to more remote targets than with the ADM 12. The combination of both principles allows an expansion of the dynamic range and the use of additional information, such as e.g. the pulse energy, in the detection of the signal and the derivation of distance information. Since, for electro-optical distance measuring devices, the dynamic range of the receiving circuit should be maximized in order to be able to cover as many types of measurement as possible, this combination of the methods affords significant advantages. Optionally, a distance measurement can be carried out simultaneously with the WFD 13 and the ADM 12, and thus can be used for a calibration of the WFD.

In the example according to FIGS. 5a and 5b, therefore, at least one of the elements integrated in the distance measuring unit 2 is used in dual use both in the first measurement functionality and in the second measurement functionality, whereas other elements are used in singular use in the first or in the second measurement functionality. Specifically, the first detection unit 12 (ADM) is used in singular use in the first measurement functionality, and the second detection unit 13 (WFD) is used in singular use in the second measurement functionality, and, according to the invention, the first beam source 30 is used in dual use in both measurement functionalities. For this purpose, the first beam source 30 optionally generates different first measurement radiation 36 depending on the measurement functionality, that is to say e.g. for the second measurement functionality with WFD pulsed radiation (as described) and for the first measurement functionality with the ADM with continuous-wave operation or e.g. by corresponding means (for example broadband laser source and wavelength filter depending on measurement functionality) first measurement radiation 36 of a different wavelength depending on the measurement functionality, wherein the beam splitters 131*a*, 131*b* can then be designed as wavelength-dependent beam splitter.

As illustrated in FIGS. 5*a* and 5*b*, the beam directing unit 10 comprises as a further option a component 160 which splits incident light and couples out a first part of said light to the localization camera (not illustrated) and a second part to a surface sensor as fine targeting sensor (not illustrated). The localization camera can comprise a dedicated optical unit and additionally an image converter. In this case, the localization camera typically has an aperture angle of around 10° and a focal length of 30 to 50 mm, for example, and serves for the coarse localization of measurement targets. For detecting reflective targets, the beam directing unit 10 can have a reflector illumination (not illustrated) with a specific illumination wavelength which illuminates an angle range that is preferably of at least the same magnitude as the aperture angle of the overview camera. The control and evaluation unit is designed in such a way that one or a plurality of bright light points are detected in the field of view of the localization camera, which correspond in each case to a reflective target. It is possible to ascertain therefrom their position in the image of the localization camera and therefrom in turn a direction to the target, whereby the laser tracker or the beam directing unit 10 and the measurement radiation are alignable with the target. Automatic target acquisition and a "lock-on", i.e. continuous tracking of a target, can thus be realized.

The light portion for the fine targeting sensor is preferably a beam of returning measurement radiation. The fine targeting unit can also comprise a dedicated optical unit. In this case, the output signal of the surface sensor is generated by means of one or more photosensitive surfaces and depends on the respective position of the light centroid. In this case, ascertaining the position of the centroid of the impinging light point can be carried out very rapidly (nanoseconds range) and with a nanometer resolution. By means of the fine targeting sensor, an offset of the impingement point of the detected beam from a servo control zero point is determined and the laser beam is tracked to the target on the base of the offset. For this purpose and in order to achieve a high accuracy, the field of view of the surface sensor is chosen to be comparatively small, i.e. corresponding to the beam diameter of the measurement beam. Detection by means of the fine targeting sensor is carried out coaxially with respect to the measurement axis, such that the detection direction of the fine targeting corresponds to the measurement direction. Tracking and fine targeting are carried out after the measurement beam, as described above, has been aligned at least coarsely with a retroreflective target (i.e. in such a way that the target lies within the light beam cone).

Figure 6:
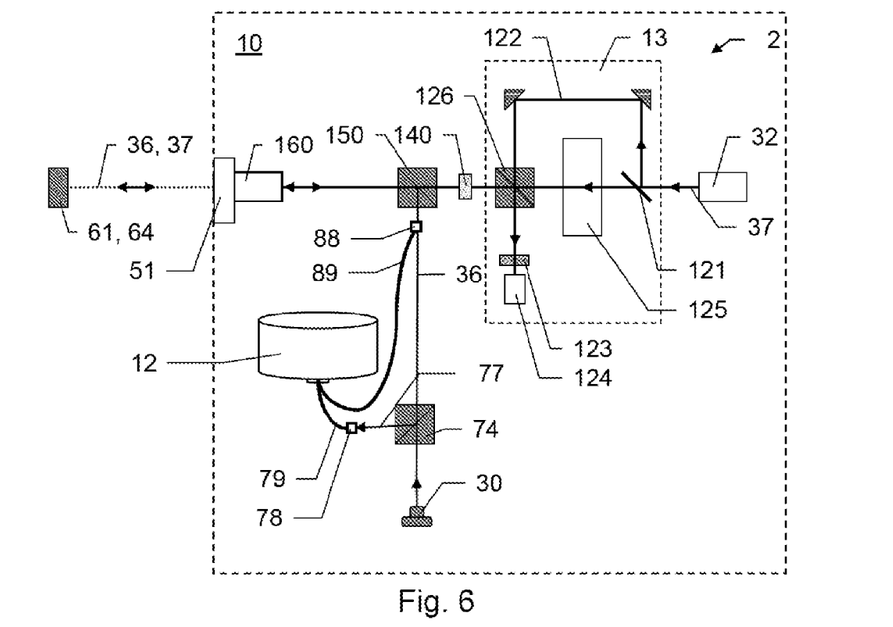
FIG. 6 shows a second embodiment of an optical construction of a laser tracker according to the invention in the case of use in the first and respectively the second measurement functionality.

FIG. 6 shows a further exemplary optical construction of a laser tracker according to the invention. The distance measuring unit 2, which is incorporated into the beam directing unit 10, once again comprises a first detection unit 12 and a second detection unit 13 as in the example according to FIGS. 5*a* and 5*b*, wherein the second detection unit 13 is likewise used in singular use only in one of the two measurement functionalities. In contrast to the previous figures, however, the first detection unit 12 is not designed for singular use in one of the two measurement functionalities, rather the first detection unit 12 is used in dual use in both measurement functionalities. Consequently, a position determination is carried out solely by means of the first detection unit 12 in one measurement functionality and by means of a combination of the first and second detection units 12 and 13 in the other measurement functionality. The second detection unit 13 is thus switched on in one of the two measurement functionalities. In particular, the first detection unit 12 is designed for determining an absolute distance and the second detection unit 13 is designed for determining a relative distance with a finer resolution or higher precision than the first detection unit 12.

The first detection unit 12 is fed by the first beam source 30, which is thus likewise used in dual use in both measurement functionalities and which is designed as a laser diode or superluminescence LED (SLED) in the example. The dual use of the first beam source 30 is a commonality of the embodiments according to FIGS. 5*a*, 5*b* and 6. Nevertheless, the second detection unit 13 is not fed by the first beam source 30, rather the second detection unit 13 is supplied with second measurement radiation 37 by a second beam source 32. Consequently, in one of the two measurement functionalities, the distance to the target 61, 64 is determined on the basis of the second measurement radiation 37 in addition to the first measurement radiation 36.

In the example according to FIG. 6, the first detection unit 12 is designed as a WFD unit. The latter is used to measure a diffusely scattering target 64 in the second measurement functionality. The beam path of the first measurement radiation 36 or the portions thereof reflected from the target 64 is analogous to the example according to FIG. 5*b*, wherein radiation 36 returning from the target 64 is directed onto a coupling-in element 88 by means of a beam splitter 150 and, if appropriate, further optical means (not illustrated here). The beam splitter 150 may in this case be e.g. wavelength-dependent and the wavelength of the first measurement radiation 36 may differ from the wavelength of the second measurement radiation 37.

The second detection unit 13 is designed as an interferometer unit in the example, which is used in the first measurement functionality (measurement with respect to a retroreflector 61) in addition to the WFD unit, wherein, as illustrated in FIG. 6, the target 61 is measured by means of the second measurement radiation 37 of the second beam source 32 in addition to the first measurement radiation 36. The first measurement radiation 36 reflected from the target 61 is evaluated by the WFD unit 12, and the reflected second measurement radiation 37 by the interferometer unit 13, such that overall the distance determination is carried out by means of the first measurement radiation 36 and the second measurement radiation 37. In the first measurement functionality, therefore, the distance to the target is determined by means of both detection units 12 and 13 and by means of both measurement radiations 36 and 37, wherein an increased accuracy is provided or made possible by the interferometer unit 13, which is advantageous e.g. in the target-tracking measurement of a retroreflective target 61.

The use of an interferometer allows an AIFM measurement (=combined measurements with ADM and IFM) of moving targets. The AIFM (=ADM+IFM) enables measurements of moving targets ("lock on the fly") by means of knowledge and taking account of the relative distance changes already measured by the interferometer without the absolute distance being known, during an ADM measurement.

The interferometer unit 13 uses light generated by the beam source 32, for example a longitudinally monomode laser radiation with a long coherence length (single frequency). The light radiation generated is split into a reference radiation 122 on a reference light path and a measurement radiation 37 on a measurement light path by a beam splitter 121. The measurement light path leads through an acousto-optical modulator 125 and impinges together with the reference light path on a polarizing beam splitter 126. The polarizing beam splitter 126 guides the measurement radiation 37 further to the, e.g. wavelength-dependent, beam splitter 150, and directs the returning measurement light together with the reference light via a polarization filter 123 to an interferometer detector 124. The method of operation of such an interferometer arrangement 13 is fundamentally known and is based on the wave interference principle. In particular, it is also possible to use other interferometer arrangements and methods in which the measurement radiation can be coupled in and out through the beam splitter 150, for example. One example of such an interferometer is described in WO 03/062744 A1. In principle, other types of interferometers (e.g. Michelson with quadrature detection) can also be used.

A superimposition of the reference radiation 122 with the measurement radiation 37 retroreflected at a movable target 61 and guided onto the interferometer detector 124 is detected at the interferometer detector 124. The intensity of the interference arising upon the superimposition of the two radiations 37, 122 can be detected continuously (as interferometer output variable) in this case. The derivation of the interferometer output variable is based here at least on the detected superimposition, wherein the interferometer output variable is dependent on a distance to the target.

If the target 61 is situated at a constant distance from the interferometer detector 124, then the intensity value measured during the maintained fixed distance to the target 61 is constant. With a relative movement—in relation to an optical axis defined by the measurement radiation 37—of the target 61 with respect to the measuring device (or with a movement of the construction), there is a change in the distance between the two components and thus a path difference between the reference radiation 122 and the measurement radiation 37 and, as a result, the intensity measurable at the interferometer detector 124 depending on the distance change. By means of the interferometer detector 124, these intensity variations can be measured and detected (as an output variable profile), in particular in a temporally resolved manner, and can be read and processed further for checking the correctness of such a distance change measurement. The temporally resolved output variable profile is generated from the derived interferometer output variable, the distance change being ascertained on the basis of the output variable profile.

In order to check the correctness of such a measurement, optionally a movement parameter is continuously derived from the intensities detected by the interferometer detector 124 and this parameter is continuously compared with a movement criterion. Depending on the comparison, information regarding the reliability of the measurement carried out is then output.

Figure 7:
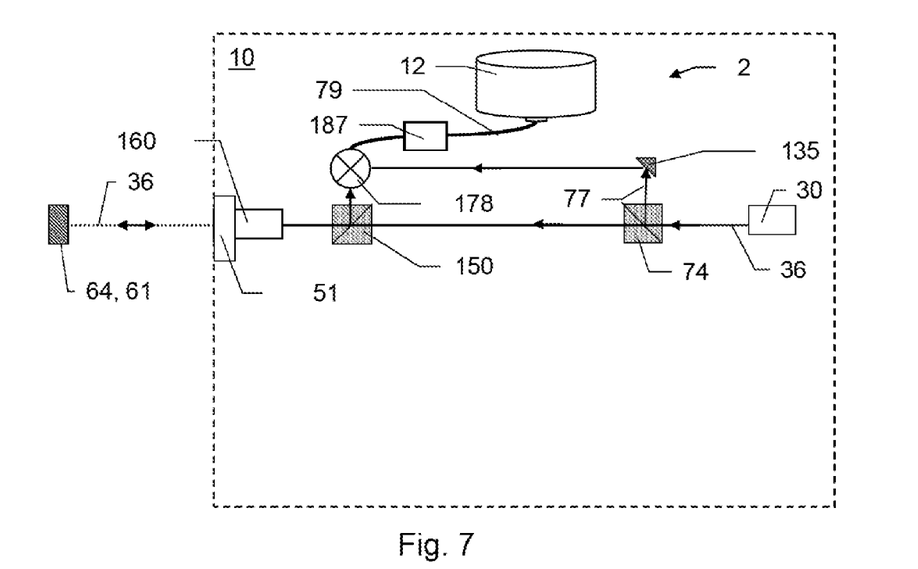
FIG. 7 shows a third embodiment of an optical construction of a laser tracker according to the invention in the case of use in the first and respectively the second measurement functionality.

FIG. 7 shows a further embodiment of the optical construction of a laser tracker according to the invention. As an alternative to the embodiments according to FIGS. 5a, 5b and 6, here the measuring device or the beam directing unit 10 does not comprise a second detector unit for distance measurement besides the first detector unit 12. Instead, the first detector unit 12 and the first beam source 30 supplying it are used in dual use both in the first and in the second measurement functionality; this being coordinated in respectively different ways in each case specifically with the requirements for the measurement of a retroreflective target or the measurement of a diffusely scattering target and/or tracking or scanning. For this purpose, by way of example, the beam source 30 is operable in at least two different operating states or with different measurement parameters, that is to say e.g. with respectively different power, pulse rate (or CW vs. pulsed operation) and/or wavelength of the first measurement radiation 36 generated. Alternatively or additionally, e.g. the first detection unit 12 is operable in at least two different operating states or different measurement parameters, e.g. with a respectively different measurement rate and/or sensitivity. In other words, therefore, the same distance measuring unit 2 is used in its entirety for both cooperative and natural targets 61, 64, the type of measurement being adapted to the respective target 61 or 64. As a consequence, optimum measurement results are achievable or better measurement results in comparison with the alternative unadapted use of the distance measuring unit 2, in the case of which it is necessary to make a mediocre compromise with regard to measurement parameters, but this is sufficient for some industrial measurement tasks. Optionally, an automatic recognition of what type of target 61 or 64 is involved is effected here e.g. by means of received reflected measurement radiation 36. Such an option is not restricted here to the present embodiment, but rather can likewise be realized in all the other embodiments.

In the present example according to FIG. 7, the first detection unit 12 is designed as an FMCW unit (frequency modulated continuous wave radar), thereby enabling a distance measurement by means of an FMCW method. In particular, the distance measuring unit 2 for this purpose can comprise a coherent laser radar, as described e.g. in EP 1 869 397 B1.

The approach for distance measurement as used in this embodiment consists in emitting frequency-modulated electromagnetic radiation, such as e.g. light, onto the target to be measured, and subsequently in receiving one or more echoes from backscattering objects, ideally exclusively from the target to be measured. After reception, the possibly superimposed echo signal is superimposed with a mixing signal and the signal frequency to be analyzed is thereby reduced, with the result that only a lower outlay is necessary in terms of apparatus. In this case, the mixing can be carried out either as a homodyne method with the transmitted signal or as a heterodyne method with a periodic, in particular harmonic signal, having a known period. The mixing serves to transform the received signal to lower frequencies. Afterward, the propagation times and thus—given a known speed of propagation of the radiation used—the distances to the targets to be measured are determined from the resulting signal.

The apparatuses used for implementing these methods usually use a signal generator as chirp generator, which impresses a signal on a modulatable radiation source. A detector or receiver with subsequent mixer, A/D converter and digital signal processor are furthermore used. A linearly frequency-modulated chirp is usually generated as the measurement signal by the signal generator. The detected echo signal of the reflected measurement radiation is detected and with the mixing signal. The mixed signal is digitized on a finite measurement interval and stored. The propagation times are determined from the frequency information and, if appropriate, the phase information of this signal. More accurate results can be obtained by taking account of the phase information. A frequency-modulated method with continuous emission (FMCW method) for distance measurement with electromagnetic radiation in the radar range is known from DE 196 10 970 A1.

In the present example, the distance measuring unit 2 comprises the first beam source 30 with drive means for generating a frequency-modulated first measurement radiation 36 having a continuously variable frequency. The frequency-modulated laser beam 36 is firstly guided onto a first beam splitter 74, whereby a reference beam 77 is split off and is guided onto a mixer element 178 by means of a deflection element 135.

The other part of the frequency-modulated laser beam 36 is directed through a second beam splitter 150 the laser emission optical unit 51 onto the target 64 or 61. Portions of the frequency-modulated laser beam 36 that are reflected from the target 61, 64 pass partly through the laser reception optical unit 51 again into the beam directing unit 10. In the latter, the reflected radiation is guided by means of the second beam splitter 150 onto the mixer element 178, in which the reflected radiation is subjected to homodyne or heterodyne mixing with the reference beam 177. Optionally, the reflected radiation may have been amplified beforehand by means of an RF preamplifier.

The resulting mixing signal 182 in the present example is passed to the first detection unit 12 by means of an optical fiber 79; in particular, the mixing signal can in this case also be passed via a low-pass filter 187 and a baseband amplifier. The control and evaluation unit, in a known manner, can then ascertain a frequency difference, i.e. in particular a separation between the frequencies of the reference beam 177 and the reflected radiation, and calculate therefrom the distance to the target 61 or 64.

Instead of the mixer element 187, it is possible to use an optical reference system for the reference beam 177. Such an optical reference system is described in EP 1 869 397 B1, for example. As an alternative to an FMCW unit or to an FMCW-based measuring method, for example, use is made of a WFD method or measurement of distances that is based on a frequency comb or is supported by a frequency comb. In the latter alternative, the distance measuring unit comprises a first beam source 30 configured for emitting a pulsed, highly precisely timed femtosecond laser having a carrier signal. As a result, a so-called frequency comb of thin sharp lines can be generated in the frequency range, which frequency comb can be used for a precise optical frequency measurement. Various approaches for the frequency-comb-based or frequency-comb-supported measurement of distances are described for example in the paper "Frequency-Comb Based Approaches to Precision Ranging Laser Radar" (N. R. Newbury, T.-A. Liu, I. Coddington, F. Giorgetta, E. Baumann, W. C. Swann; National Institute of Standards and Technology).

It goes without saying that these illustrated figures merely schematically illustrate possible exemplary embodiments. According to the invention, the various approaches can likewise be combined with one another and with systems and methods for measuring surfaces or objects and with measuring devices from the prior art.

What is claimed is:

1. A laser tracker for industrial coordinative position determination of a target, wherein the laser tracker comprises:
   a base;
   a control and evaluation unit for dataprocessing and controlling the laser tracker;
   a beam directing unit, which is rotatable about two axes relative to the base and includes an emission and reception optical unit for emitting light as measurement radiation onto the target and for receiving measurement radiation reflection;
   a means for detecting rotation angles of the beam directing unit relative to the base; and
   an optical distance measuring unit, by means of which an absolute distance to the target is determinable for coordinative position determination,
   wherein the optical distance measuring unit comprises:
      a first beam source for generating a first measurement radiation, and
      a first detection unit for detecting received measurement radiation reflection,
   wherein the control and evaluation unit and the optical distance measuring unit are configured to implement a first and a second measurement functionality, wherein at least one element of the distance measuring unit is configured for dual use in both the first and in the second measurement functionality,
   wherein the optical distance measuring unit is embodied in an integrated design,
   wherein the first measurement functionality is coordinative position determination of a retroreflective target, and
   wherein the second measurement functionality is coordinative position determination of a diffusely scattering target.

2. The laser tracker according to claim 1, wherein the first beam source is an element for dual use in different operating states.

3. The laser tracker according to claim 1, wherein the laser tracker is configured to continuously track a moving retroreflective target in the first measurement functionality, and/or carry out a plurality of distance measurements with respect to a plurality of diffusely scattering targets on a surface of a measurement object in the context of the second measurement functionality, and wherein the control and evaluation unit is configured to:
   combine the respectively detected rotation angles with the plurality of distance measurements, such that in each case a point position of the respective target point is defined by the combination, and
   generate a point cloud comprising a number of the point positions.

4. The laser tracker according to claim 1, wherein:
   the control and evaluation unit comprises a switchover functionality for automatic selection, based on of received measurement radiation reflection, of the measurement functionality that is suitable for the target,
   the laser tracker comprises an optical image capture unit with a two-dimensional light-sensitive array,
   the control and evaluation unit is configured to have an image processing functionality, such that an orientation of an auxiliary measuring instrument comprising optical markings is determinable by capture and image processing of an image of the image capture unit, and
   the laser tracker comprises a target finding unit with illumination means and localization camera.

5. The laser tracker according to claim 1, wherein the first detection unit is designed for determining absolute distances.

6. The laser tracker according to claim 1, wherein both the first beam source and at least one further element of the distance measuring unit are designed for dual use.

7. The laser tracker according to claim 6, wherein all elements of the distance measuring unit are designed for dual use.

8. The laser tracker according to claim 1, wherein at least one element of the distance measuring unit is designed for singular use in only the first or only the second measurement functionality.

9. The laser tracker according to claim 8, wherein the at least one element of the distance measuring unit designed for singular use is a second detection unit comprised by the distance measuring unit.

10. The laser tracker according to claim 9, wherein the distance measuring unit is configured such that the first beam source serves as an element for dual use such that first measurement radiation generated by it is detectable by the first detection unit and also by the second detection unit.

11. The laser tracker according to claim 9, wherein the distance measuring unit comprises, as at least one further element for singular use, a second beam source for generating second measurement radiation, and wherein the distance to the target is determined either in the first or in the second measurement functionality with the additional use of the second measurement radiation.

12. The laser tracker according to claim 11, wherein the second detection unit is configured to determine relative distances and serves for singular use in the first measurement functionality, and wherein the second measurement radiation generated by the second beam source is detectable by the second detection unit.

13. A method for industrial coordinative position determination of a target by means of a laser tracker, wherein the laser tracker includes a base, a control and evaluation unit, a beam directing unit having an emission and reception optical unit for emitting light as measurement radiation and for receiving measurement radiation reflections, and an optical distance measuring unit having a first beam source and a first detection unit, wherein the method comprises:
generating first measurement radiation by means of the first beam source;
emitting first measurement radiation and receiving first measurement radiation reflected from the target by means of the emission and reception optical unit;
detecting received reflected first measurement radiation;
determining a distance to the target based on detected received reflected first measurement radiation; and
determining rotation angles of the beam directing unit relative to the base,
wherein based on determined rotation angles and at least one determined distance, a first measurement functionality is performed to determine a coordinative position determination of a retroreflective target, and a second measurement functionality is performed to determine a coordinative position of a diffusely scattering target,
wherein at least one element of the distance measuring unit is used in dual use both in the first measurement functionality and in the second measurement functionality.

14. The method according to claim 13, wherein determining a distance to the target is carried out both in the first and in the second measurement functionality using the first measurement radiation, and the method further comprises:
continuously tracking the target.

15. A computer program product having program code, stored on a machine-readable carrier, for controlling or carrying out the method according to claim 13.

* * * * *